United States Patent Office 3,357,810
Patented Dec. 12, 1967

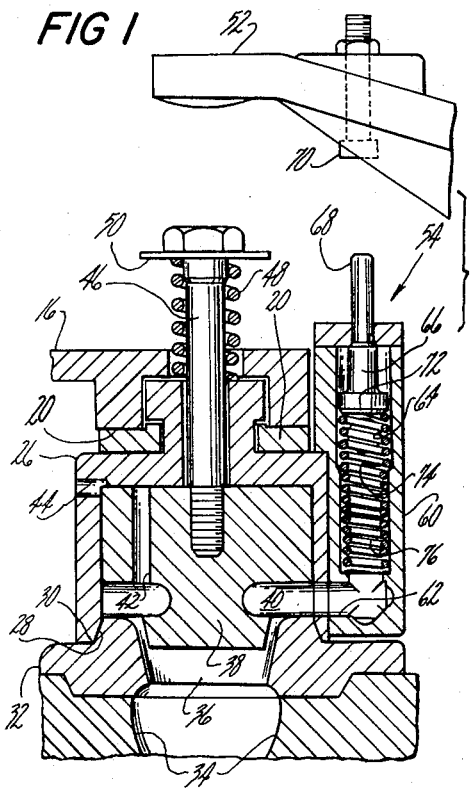

3,357,810
SETTLE BLOWHEAD AND BAFFLE ATTACHMENT FOR GLASSWARE FORMING MACHINE
John E. Crouse, West Hartford, Conn., assignor to Emhart Corporation, a corporation of Connecticut
Filed June 10, 1964, Ser. No. 373,981
3 Claims. (Cl. 65—234)

ABSTRACT OF THE DISCLOSURE

A construction cooperating with the top of a parison mold in a glassware forming machine which construction includes a blowhead engageable with the top of the parison mold or a funnel therefor. This construction includes a baffle movable in the blowhead to close the funnel or mold opening, but the baffle is normally spring-biased to an open position. The blowhead carries a first valve which is normally open and cooperates with the normally open baffle to define a conduit for air under pressure to settle a gob of glass in the mold. When the blowhead is placed over the mold, a second valve is opened to permit the flow of air to the first valve to provide the settle pressure. After the blowhead is placed over the mold, an arm moves down to engage and move the baffle to a closed position on the mold or funnel, and this arm carries a stop which closes the normally open first valve to prevent the settle air from reaching the mold. It is at this time that the parison is formed by air or by a plunger acting from below. When the parison has been formed, the baffle arm is removed and the baffle opens. However, the first valve remains closed by air under pressure from the now open second valve, and this condition maintains until the blowhead is moved away from the mold. When such movement occurs, the second valve closes automatically and this cuts off air to the first valve which is thereby permitted to open, thus restoring all of the parts to their initial positions or condition.

The present invention relates to the manufacture of blown glassware and deals more particularly with a cyclically operated machine in which a glass charge or gob is fed into a blank or parison mold where it is successively settle blown, and then counterblown to form a parison prior to being transferred to a finish mold for subsequent final blowing.

In machines for producing blown glassware, the charge or gob of molten glass is smaller than the cavity provided in the parison mold, and after the gob has been dropped or fed into the mold, air is usually introduced into the opening through which the gob has been introduced to settle the glass in the parison cavity. In order to permit an inverted parison to be subsequently blown from below, this filler opening or port must be closed by a baffle or the like, which baffle is contoured to define a portion of the parison cavity.

The general object of the present invention is to provide an improved apparatus for settle blowing the glass charge, which apparatus includes a suitable baffle for closing off the filler opening and also includes suitable valve means for shutting off the air used for the settle-blowing operation until another glass charge is to be settle blown.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a vertical sectional view of a settle blowhead and baffle apparatus of the present invention, showing the upper portion of a parison mold engaged by the apparatus and a hold-down arm in its retracted position.

FIG. 2 is a view similar to FIG. 1 but showing the hold-down arm in its operative or engaged position.

Referring now to the drawing in greater detail, FIG. 3 shows a vertical post 10 which is reciprocably received in a stationary support 12 for up and down movement as indicated by the double ended arrow 14. The cycle of operation of this post is or may be programmed by well known means in a glassware forming machine such as those fully described in U.S. Patent No. 1,911,119 to Ingle. An arm 16 is attached to the post 10 by a collar 18 and the arm supports a blowhead and baffle assembly to be described.

As shown in FIG. 1, the outer end of this arm 16 cooperates with a ring 20 to support a depending inverted cup-shaped blowhead 26 for limited horizontal movement relative to the arm. The blowhead 26 has a generally cylindrical bore, and its lower peripheral edge 28 defines an annular seating surface which is adapted to mate with a corresponding surface 30 on a funnel 32 to locate the blowhead relative to the funnel and an associated parison mold 34. The funnel is located on the upper portion of the mold 34 which defines a parison cavity to receive a charge or gob of molten glass dropped through the funnel opening before placing the blowhead thereon. As shown, the funnel opening also defines a portion of said parison cavity. It should be noted, however, that the blowhead could be adapted to seat directly on the mold 34, as if the funnel 32 were constructed integrally with the halves of the said mold. In either event, the parison cavity must be provided with a top or filler opening 36 through which the charge or gob of molten glass is fed.

As shown in FIGS. 1 and 2, a baffle 38 is slidably received in the bore of the blowhead 26 for movement between a first position wherein its lower end closes said top opening (FIG. 2) and a second position (FIG. 1) wherein it cooperates with the blowhead to define a passageway 40 communicating with the parison cavity. The baffle 38 also has a vent or bleed opening 42 which communicates with the space above the baffle when the latter is in its first position, and with the atmosphere by reason of the opening 44.

A vertical post 46 is threaded into the upper end of the baffle 38 and extends upwardly threfrom through an opening in the upper portion of the blowhead 26. A compression spring 48 surrounds this post 46 and acts between a flange 50 on its upper end and the top surface of the blowhead 26 to urge or lift the baffle 38 into its second position. The post 46 extends through the opening in the arm 16 and is adapted to be engaged by a hold-down arm 52 which is cyclically operated by a suitable mechanism to move the baffle into its first position against the bias of the spring 48.

In accordance with the present invention, a first or settle valve 54 is provided adjacent the passageway 40 and in communicaton therewith. Thus, the passageway 40 is adapted to be selectively pressurized by a conduit means 56 which is connected between the valve means and a source of air under pressure (not shown). A second or activating valve 58 is provided in said conduit means 56 (FIG. 3) for a purpose to be described.

The valve means 54 comprises an elongated valve housing 60 carried at one side of the blowhead 26 and having a lower or outlet port 62 in communication with the passageway 40 and an upper or inlet port 64 in communication with the conduit means 56. An elongated valve member 66 is slidably received in the housing 60 and has a stem 68 which extends through the top of the housing where it can be engaged by an adjustable stop 70 on the hold-down arm 52 for closing the valve. The valve member 66 has a lower head portion 72 which engages an annular seating surface 74 defined in the housing 60 between the outlet and inlet ports 62 and 64 respectively. A compression spring 76 is provided between the lower end of the head portion 72 and an upwardly facing shoulder defined in the housing 60 to open the valve, but this spring 76 is of such strength that inlet air under normal pressure acting on the top of the head portion 72 will hold the valve closed until this pressure is reduced below a predetermined value. The reopening of the valve means 54 is accomplished by the second valve 58 in a manner to be described.

The second valve 58 is normally closed but is quite similar in construction to the valve means 54, having a housing 78 which is attached to the stationary support 12 as shown in FIG. 3. An actuating arm 80 is attached to the reciprocable post 10 and is adapted to open the valve 58 when the post 10 and the blowhead arm 16 have reached the position shown in FIG. 3. As mentioned hereinabove, this position corresponds to the blowhead position shown in FIGS. 1 and 2, and when the post 10 and its associated arms 16 and 80, are raised following the successive settle blowing and counterblowing operations, it will be apparent that the valve 58 will close.

The second valve housing 78 has a lower or inlet port and an upper or outlet port and defines a downwardly facing valve seat between these ports. An elongated valve member 82 has an upper stem portion which protrudes through the top of the housing 78 for engagement by the aforementioned arm 80 and an intermediate portion of enlarged cross section which is adapted to engage said valve seat. A lower portion of the valve member 82 is engaged by a compression spring 84 to urge the valve member towards its seat. As so constructed, the second valve 58 is normally closed and is opened only when the blowhead 26 is in position on the funnel 32, as shown in FIGS. 1 and 2.

In the operation of the above-described device, a charge or gob of molten glass is first fed into the funnel 32 while the arm 16 holds the blowhead 26 out of the way, thus exposing the filler opening 36 at the top of the parison cavity. Then, when the arm 16 is lowered, allowing the blowhead 26 to descend around the opening 36, the baffle 38 is held in the position shown in FIG. 1 by the spring 48 so that air under pressure can be admitted to the blowhead via the conduit 56, the valve means 54 and passageway 40. The second valve 58 will have been opened as shown in FIG. 2 when the arm 16 has been so positioned to allow the air to reach this passageway 40.

As mentioned hereinabove, the air so admitted effectively settles the glass in and around the neck portion of the inverted parison mold prior to the counterblowing operation. During counterblowing, the filler opening 36 must be closed as shown in FIG. 2 by the baffle 38. It is an important feature of the present invention that the proximity of the valve means 54 to the blowhead 26 assures the substantially simultaneous throttling of settle-blow air as the opening 36 is closed by the baffle 38. That is, as the hold-down arm 52 engages the post 46 seating the baffle 38 it also engages the valve stem 68 to close the valve 54. The valve stem 68 is engaged by an adjustable stop 70 so that the throttling of settle-blow air can be timed as desired in relation to closing of the baffle 38.

Following the counterblowing operation, the hold-down arm 52 is raised by a suitable mechanism (not shown) operating in properly timed relationship to the other parts of the machine. The baffle 38 will resume its FIG. 1 position but the valve stem 68 will remain in the closed position shown in FIG. 2 as a result of the settle-blow air pressure on top of the valve member head portion 68. Thus, settle-blow air is prevented from reaching the formed parison following the raising of the baffle 38. It is not until after the post 10 and arm 16 are elevated to elevate the blowhead 26, at which time the valve operating arm 80 is also elevated to permit the second valve 58 to close, that the spring 76 reopens the valve 54. Once the second valve 58 has closed, the valve 54 will reopen due to the loss of pressure in the conduit 56 therebetween, the spring 76 acting upon the valve member 66 to return it to its FIG. 1 position.

The invention claimed is:

1. In a machine for blowing an inverted glassware parison in a mold having a top opening for receiving a gob of molten glass, the combination comprising a hollow blowhead, means supporting said blowhead for movement out of and into engagement with the mold around said top opening, a baffle movable in the blowhead into closed position in the top opening for the blowing of the parison and out of closed position to permit the introduction of air under pressure to the mold to settle a gob of glass, means biasing said baffle out of closed position wherein it cooperates with the blowhead to define a passage for the introduction of such air under pressure, conduit means for connecting said passage to a source of air under pressure and including a normally open first settle valve and a normally closed second activating valve, means operable whenever said blowhead engages the mold to open said second valve, and means selectively operable only when said blowhead is engaged with the mold to close said baffle and to close said first valve, said first valve being adapted to remain closed due to the pressure of air in said conduit means which pressure will be dissipated only upon closing of said second valve.

2. In a machine for blowing an inverted glassware parison in a mold having a top opening for receiving a gob of molten glass, the combination comprising an inverted generally cup-shaped blowhead, means supporting said blowhead for movement away from the mold and into engagement therewith around the said top opening, a baffle reciprocable in said blowhead to close said top opening for the blowing of the parison and having an open position permitting the introduction of air under pressure through the top opening to settle a gob of glass in the mold prior to blowing, means biasing said baffle to its open position, said baffle and blowhead cooperating in the open position of the baffle to define a passage for the introduction of such air under pressure, conduit means for connecting said passage to a pressurized source of air including a normally open first settle valve movable with the blowhead and a normally closed second activating valve, means operable only upon engaging said blowhead with the mold to open said second valve, and means selectively operable only when said blowhead is in engagement with the mold to close said baffle and to close said first valve, said first valve being adapted to remain closed responsive to the pressure of air in said conduit means until said blowhead has been removed from the mold and said second valve has been closed.

3. In a machine for blowing an inverted glassware parison in a mold having a top opening for receiving a gob of molten glass, the combination comprising an inverted generally cup-shaped blowhead, means supporting said blowhead for movement out of and into engagement with the mold around said top opening, a baffle reciprocable in the blowhead into closed position in the top opening for the blowing of the parison and out of closed position to permit the introduction of air under pressure to the mold to settle a gob of glass, means biasing said baffle out of closed position wherein it cooperates with the blowhead to define a passage for the introduction of such air under pressure, conduit means for connecting said passage to a source of air under pressure and including a normally open first settle valve carried by the blowhead and a normally closed second activating valve operable by the blowhead support means whenever the blowhead engages the mold to open said second valve, and an arm selectively operable only when the blowhead engages the mold to close said baffle and to close said first valve, said first valve being adapted to remain closed due to the pressure of air in said conduit means which pressure will be dissipated only upon closing of said second valve.

References Cited

UNITED STATES PATENTS

| | | | |
|---|---|---|---|
| 672,716 | 4/1901 | Semple | 65—261 X |
| 1,647,532 | 11/1927 | Lorenz | 65—261 |
| 2,081,858 | 5/1937 | Howard | 65—234 |

DONALL H. SYLVESTER, *Primary Examiner.*

F. W. MIGA, *Assistant Examiner.*